US010257469B2

(12) United States Patent
Edwards et al.

(10) Patent No.: US 10,257,469 B2
(45) Date of Patent: Apr. 9, 2019

(54) NEIGHBORHOOD CAMERA LINKING SYSTEM

(71) Applicant: Honeywell International Inc., Morristown, NJ (US)

(72) Inventors: Lewin A. Edwards, Forest Hills, NY (US); Jonathan Klinger, Great Neck, NY (US); Mike Garavuso, Lindenhurst, NY (US)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 15/191,717

(22) Filed: Jun. 24, 2016

(65) Prior Publication Data

US 2016/0309123 A1    Oct. 20, 2016

Related U.S. Application Data

(63) Continuation of application No. 13/079,835, filed on Apr. 5, 2011, now abandoned.

(51) Int. Cl.
*H04N 7/18* (2006.01)
*G06K 9/00* (2006.01)
*G08B 13/00* (2006.01)

(52) U.S. Cl.
CPC ......... *H04N 7/181* (2013.01); *G06K 9/00771* (2013.01); *G08B 13/00* (2013.01)

(58) Field of Classification Search
CPC ..... G06K 9/00771; G08B 13/00; H04N 7/181
See application file for complete search history.

(56) References Cited

U.S. PATENT DOCUMENTS

| 5,289,275 | A | 2/1994 | Ishii et al. |
| 6,069,655 | A | 5/2000 | Seeley et al. |
| 6,081,193 | A | 6/2000 | Trucchi et al. |
| 6,208,379 | B1 * | 3/2001 | Oya ............... G08B 13/1968 348/143 |
| 6,300,976 | B1 | 10/2001 | Fukuoka |
| 6,433,683 | B1 | 8/2002 | Robinson |
| 7,023,913 | B1 * | 4/2006 | Monroe ......... G08B 13/19628 348/143 |

(Continued)

OTHER PUBLICATIONS

Total Connect Online Help Guide, Honeywell document 800-02577-TC 3/10, Revision A, www.honeywell.com/security, Copyright 2010 Honeywell International Inc.

*Primary Examiner* — Peter D Le
(74) *Attorney, Agent, or Firm* — Husch Blackwell LLP

(57) ABSTRACT

Systems and methods for linking neighborhood cameras and recording video from cameras that monitor public areas proximate neighborhood homes are provided. Some methods can include providing a plurality of cameras, each of the plurality of cameras linked to a respective security system in a plurality of security systems, each of the plurality of security systems protecting a respective building in a plurality of buildings, detecting an alarm event in a first security system of the plurality of security systems, and responsive to detecting the alarm event in the first security system, instructing the plurality of cameras to record video of a public area proximate the respective building in the plurality of buildings protected by the respective security system in the plurality of security systems linked to each respective camera in the plurality of cameras.

15 Claims, 2 Drawing Sheets

(56) References Cited

U.S. PATENT DOCUMENTS

| | | |
|---|---|---|
| 2004/0132489 A1 | 7/2004 | Ryley et al. |
| 2004/0199785 A1 | 10/2004 | Pederson |
| 2005/0128314 A1 | 6/2005 | Ishino |
| 2005/0174229 A1* | 8/2005 | Feldkamp ........ G08B 13/19656 340/506 |
| 2006/0017579 A1 | 1/2006 | Albert et al. |
| 2006/0082651 A1 | 4/2006 | Hirafuji et al. |
| 2007/0030857 A1 | 2/2007 | Fulknier et al. |
| 2007/0110017 A1 | 5/2007 | Fulknier et al. |
| 2009/0289788 A1 | 11/2009 | Leblond |
| 2010/0064377 A1* | 3/2010 | Farrell ................ G06F 21/6245 726/28 |
| 2010/0095335 A1 | 4/2010 | Wilson et al. |
| 2010/0097470 A1* | 4/2010 | Yoshida ........... G08B 13/19641 348/159 |
| 2010/0141762 A1 | 6/2010 | Siann et al. |

* cited by examiner

NEIGHBORHOOD CAMERA LINKING SYSTEM

CROSS-REFERENCE TO RELATED APPLICATIONS

This application is a continuation of and claims the benefit of the filing date of U.S. application Ser. No. 13/079,835 filed Apr. 5, 2011.

FIELD

The field relates to security systems and more particularly, to the recording of images related to security events.

BACKGROUND

Home security systems are generally known. Such systems typically include one or more sensors to detect intruders.

Typically, the sensors are coupled to a common control panel that allows the system to be armed and disarmed. The control panel is usually provided with an audible alarm to alert occupants of the home to the detection of an intruder. The control panel may also be equipped to send an alarm message to a central monitoring station in order to automatically summon police in the event of a break-in.

In simple security systems, the sensors may simply include one or more perimeter switches intended to be activated by the opening of doors or windows of the home. In more sophisticated systems, motion detectors may be used to detect the movement of an intruder.

Home security systems are also known to include video imaging devices such as cameras. Such devices may be used to capture images of intruders once an intrusion has been detected. Alternatively, the frames of images may be continuously analyzed by a computer in order to detect motion and to trigger an intrusion alarm without any need for perimeter switches.

Alternatively, cameras may be mounted to monitor and record images of public spaces outside of the home for later review after a crime has occurred. However, intruders often notice such cameras and obscure their images or use another route. Accordingly, a need exists for better methods of controlling cameras that monitor public spaces proximate homes.

DETAILED DESCRIPTION OF AN ILLUSTRATED EMBODIMENT

Figure 1:
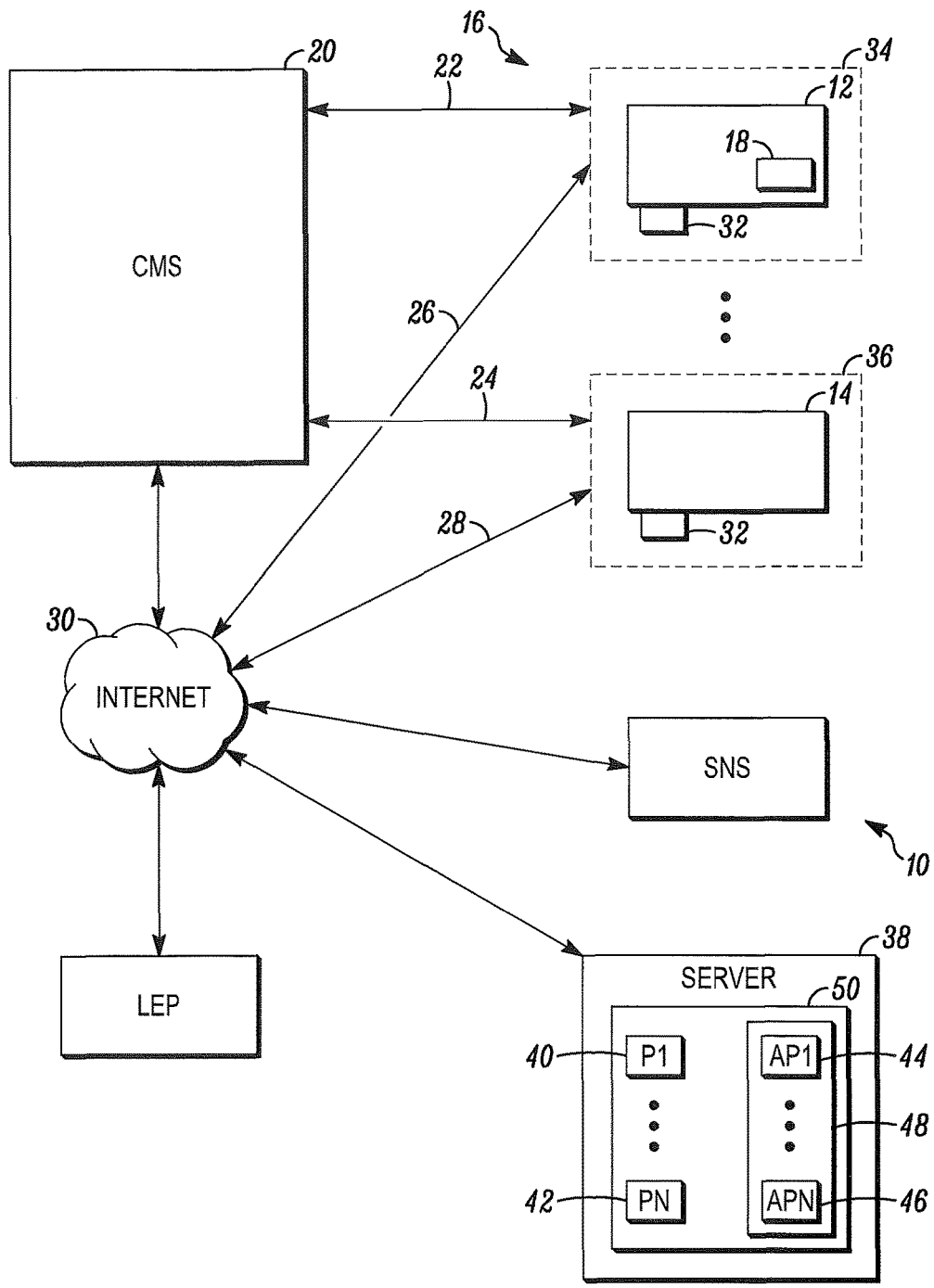
FIG. 1 is a block diagram of a security system network in accordance with an illustrated embodiment.

FIG. 1 is a block diagram of a security network 10 shown generally in accordance with an illustrated embodiment described herein. Included within the network 10 is a number of homes 12, 14, each protected by a security system 18, including an alarm panel and a number of intrusion detection devices (e.g., perimeter sensors, motion detectors, etc.).

The security systems 18 may each be connected to a central monitoring station 20 via a hardwired connection 22, 24. The security systems 18 may also be connected to the central monitoring station 20 via a broadband Internet connection 26, 28 through the Internet 30.

During operation, each of the security systems 18 may be armed or disarmed in a normal manner by a user (e.g., the homeowner, the homeowner's children, etc.). Once armed, the security system may detect intruders via activation of an intrusion sensor, activate a local audible alarm and send an alarm message to the central monitoring station 30. The central monitoring station 20 may receive the alarm message and, in response, dispatch the police.

Associated with at least some or all of the homes 12, 14 may be a camera 32. The camera 32 may be of a type commonly referred to as an Internet camera. The camera 32 may be mounted in an interior or on an exterior of the home 12, 14 and monitor a public area 34, 36 directly proximate the house 12, 14.

In this regard, a number of vendors (e.g., Honeywell), sell Internet-connected consumer video cameras that attach directly to a home broadband network 26, 28. Homeowners frequently point such cameras at exterior windows to view approach routes, monitor deliveries, visitors, vehicles or outdoor pets, etc. Each such camera only covers a small field of view, so any individual video feed is not of great utility if a neighborhood emergency occurs. For example, a rear window camera might catch a burglar approaching the house, but it would probably not see the criminal's getaway vehicle. A neighbor's camera might be looking directly at the vehicle in question, but it would have no particular reason to record the images, so important crime-fighting evidence would be lost. Some consumer camera vendors provide a centralized registration point (e.g., a website) that allows a user to save and have exclusive access to the video from such devices.

Under one illustrated embodiment, the camera 32 is coupled to a server 38 that allows remote control and access to (video from) the camera 32 in a way that benefits the homeowner and the homeowner's neighbors. These benefits are achieved on a number of different levels. For example, during the registration/setup process for each camera 32, the homeowner can designate that the camera 32 faces a public space proximate the home, and elect either to share the feed (video stream) with neighbors and law enforcement, or with law enforcement only. Note that the identity of neighbors can be automatically determined using the geolocation of IP addresses of the camera and of the neighbors. The end goal is that if there is any local incident (e.g., burglary, abduction (Amber Alert), fire, etc.), a homeowner can visit the website of the camera 32 within the server 38 and see not only his/her own camera feeds, but also data from any nearby cameras that have been shared by their owners. However, these feeds are not necessarily public; they can be restricted to local residents, forming a sort of "neighborhood watch" social network. Several refinements/additions to this basic concept are described below. Observe that the structure of the system 10 leads to cost-sharing models that may encourage uptake of subscription services provided hereunder. For instance, local law enforcement might subsidize the fees for shared cameras, or a homeowners association might include the cost in its normal dues.

The camera 32 may operate in a number of different modes, where the modes may operate either separately or simultaneously. The functional aspects of each of the modes may be provided via the use of one or more processors 40, 42 (located within the server 38 or camera 32) operating under control of software (programs) 44, 46 loaded from a non-transitory computer readable medium (memory) 48.

The modes and operating characteristics of the programmed processors 40, 42 may be structured via a set of steps, some of which are optional. In this regard, the camera 32 may be provided with a start up disk that allows set up of the camera 32 by prompting the homeowner to open a subscriber account 50 (including a website) within the server 38.

For example (and as a first step), when the customer is setting up a new camera 32, he/she specifies an access level. In this regard, a first (default) level is private. The private mode is used for internally-faced cameras. In this case, the camera's images will be available only to the individual subscriber (homeowner). This is the default setting.

Alternatively, the camera 32 may be designated as available for law enforcement use. In this case, the images from the cameras 32 are available to the individual subscriber and to local law enforcement (where "law enforcement" might be defined as the central station 20, the police precinct, a private security service in a gated community, etc, depending on the application).

Alternatively, the camera 32 could be designated as available for use by direct or close neighbors. In this case, the images from the cameras 32 are available to the individual subscriber, local law enforcement, and neighbors.

Alternatively, the camera 32 could be designated as available for use by the public. In this case, the images from the cameras 32 are available to anyone with access to appropriate website within the server 38.

As a second step in set up of a camera 32, camera 32 may be linked to the homeowner's security system 18. The homeowner may choose this option and the link will be automatically established. If this link is established, then an alarm event in the security system for any home in the neighborhood (including the homeowner selecting this option) will automatically trigger all cameras 32 in the neighborhood to wake up and begin recording to memory 48.

As a third, optional step selected by the user, a processor 40, 42 within the user's account 50 may function as an additional integration point. In this case, the account 50 may operate to link the video from the camera 32 into the user's subscription to various social networks, such as Facebook, LinkedIn, etc. For example, a set up processor 40, 42 of the user's account 50 may place a link on the user's Facebook page that is linked to video from the camera 32. The customer may then choose to share the camera feed with friends on that social network via that link. The desired result is to extend the concept of "neighborhood watch" to one's "virtual neighborhood" of friends, so that (for example) geographically remote persons can be asked to help watch the user's home 12, 14 while the user is away on a holiday without needing to provide the login credentials of the account 50 directly to that person.

As a fourth step, the user may be required to log into his/her account 50 and select the format of the displayed information. Operating in the background may be one or more geolocation processors 40, 42. The geolocation processors 40, 42 operate to create links on webpages downloaded to a user that also connect the user to the video feeds from cameras 32 of neighbors. When the subscriber logs into his/her account 50, he/she will see one or more Internet links that connect the subscriber to the feeds and historical archive footage from his/her own cameras, and any cameras that his/her neighbors have set up with the "Neighbors" or "Public" access levels. These feeds may appear automatically upon sign-in of the user into the user's account or the user may activate a link at the beginning of each sign-in where sign-in initiates collection and display of video images. The concept of "neighbor" in this concept is defined by geolocation. The geoprocessors 40, 42 may use third-party geolocation services such as ip2location.com to retrieve and to provide a simple mapping of IP address to latitude/longitude in order to identify neighbors and to create the webpage links to the accounts 50 and video images from cameras 32 of neighbors. Optionally, if the social networking step above was elected, the subscriber will also see feeds from his/her friends on that social network.

It should be noted here that the geolocation processors 40, 42 within the server 38 may also send an identifier of the camera 32 and/or IP address of the account 50 to the central monitoring station 20. Using the geographical coordinates of the camera 32, the central monitoring station is automatically able to associate the camera 32 of the homeowner with the security system 18 of the homeowner. Once the camera 32 is associated with the security system 18, the central monitoring station is able to trigger the recording of video from the camera 32 of a home in the event of activation of the security system 18 during a break-in at the home. The central monitoring station 20 is also able to activate cameras 32 of neighbors using the same process. The video images from the camera 32 of the activated security system 18 and from neighbors may be saved in a database of the server 38 along with an incident identifier from the central monitoring station that allows the saved video to be easily retrieved and reviewed by the homeowner of the activated security system 18 or by police during a later investigation by police.

Similarly, the geolocation of cameras 32 may be used by the geolocation processors or a separate registration processor may register the cameras 32 with local law enforcement organizations. In this regard, registration may simply be by the geolocation processor sending a street address and IP address of the camera 32 and/or account 50 thereby allowing the local law enforcement organization to activate the camera 32 whenever a need arises.

As a fifth step, one or more processors 40, 42 operating in the background may operate to detect that a camera has been power-cycled, or physically moved, based on IP geolocation data. When such an event is detected, the processor 40, 42 automatically resets the access level to Private and resets neighbor relationships so the user will no longer see any other "neighbor" camera feeds. This is to prevent, for example, a burglar bringing a camera with him to a given location, setting himself up as a neighbor at that location using somebody's open Wi-Fi connection, then using this neighbor relationship to carry out surveillance on a target neighborhood.

As an optional sixth step, the cameras 32 may continuously collect video images. One or more motion detection algorithms on a motion detection processor 40, 42 within the cameras 32 can be used to detect and allow a tracking processor 40, 42 within the server 38 to follow a moving object through the neighborhood. In this case, the motion processors 40, 42 may analyze video from more than one camera 32 to detect moving objects and the tracking processor may correlate the movement of the detected object among cameras 32. Combined with video analytics such as license plate number recognition or facial recognition, this mode can provide useful tracking capabilities.

For example, the motion detection and tracking processors 40, 42 may be used to accomplish direct tracking of individuals/vehicles after an alarm, particularly when multiple systems are linked as described in the second step. In this application, an alarm in any linked system 18 will cause all nearby cameras 32 to wake up and identify any features (license plates, faces) they can see. Analytics software on a processor 40, 42 of the server then allow the homeowner to follow the vehicle or person through the neighborhood.

As a more specific example, motion detection and analytics software operating on a processor 40, 42 within the camera 32 or server 38 may provide an identifying characteristic of the moving object (e.g., a license plate number). The identifying characteristic may then be transferred to the tracking processor 40, 42 (operating at a system level) within the server 38. In this regard, the tracking processor 40, 42 may receive identifying characteristics from many different cameras 32. By comparing the characteristics received from many different cameras 32, the tracking processor 40, 42 is able to create a tracking file that saves the identifying characteristic, an identifier of the camera 32 and a time when the identifier was detected by the camera 32. The tracking processor 40, 42 may also save the raw video from each camera 32 that shows the moving object during that time sequence as proof of the context of detection.

The capability of tracking moving objects based upon identifying characteristics can be very important for tracking the activities of moving objects in general throughout the neighborhood. This may allow police to later review such activity to identify suspects of crimes that may not have been detected by any security system 18 (e.g., a car theft outside a home 12, 14). Alternatively, police personnel may download a particular characteristic (e.g., a license number) to the server 38 and allow a reporting processor 40, 42 within the server 38 to report any incident of detection and locations and times of detection.

The motion detection and tracking processors 40, 42 may also be used to enhance enforcement of restraining order or sex offender rules. In this example, always-on cameras 32 and processors 40, 42 with face recognition capabilities can detect human faces and compare the facial characteristics of detected faces with faces within an offender database and trigger an email alert or other type of alarm if a registered sex offender or a specific individual with a restraining order either enters the neighborhood, in general, or comes into view of a certain specific camera 32. This may be done by the motion processors 40, 42 generating a set of facial characteristics of each detected face of a human and forwarding the facial characteristics to a face processor 40, 42 within the server 38 or police headquarters. Tracking of individuals may be accomplished as discussed above.

In general, the server 38 may maintain its own database of identification characteristics. This could be a database of identification characteristics of local sex offenders, license plates of recently stolen cars or any other important identifier local residents consider important to their safety.

In a similar manner, the motion detection and tracking processors 40, 42 may be used to accomplish human tracking of a specific person (e.g., in the case of an Amber Alert or "pre-Amber Alert" tracking situation) based upon the concept of "where was my child last seen?" Similar to the previous use case, a homeowner may ask "Where is my child?" In this case, it may be assumed that the homeowner/parent has transferred an image of the child to the server 38 from a computer in the home 12, 14 of the homeowner/parent. In this case, remote video analytics of a child tracking processor 40, 42 may be used to identify and indicate through an alert sent to the computer of the parent's home 12, 14 which camera 32 in the neighborhood or in the whole network most recently saw the given person (or a sequence of times and cameras 32 where the child was most recently seen). Note that the homeowner is not seeing video from that remote location; he/she is only being told "That face was most recently seen at the following location, at the following time". The use case would be: The homeowner registers the child's face with a system recognition and tracking processor 40, 42 of the server 38. If the child goes missing, before calling the police, the homeowner would query the processor 40, 42 to ask where that face was most recently seen. This might avoid the need for police involvement; i.e. if the child was last seen walking up to a friend's house (even if that house is a long way away, as long as it has a camera 32), the next step would be to call that house.

Figure 2:
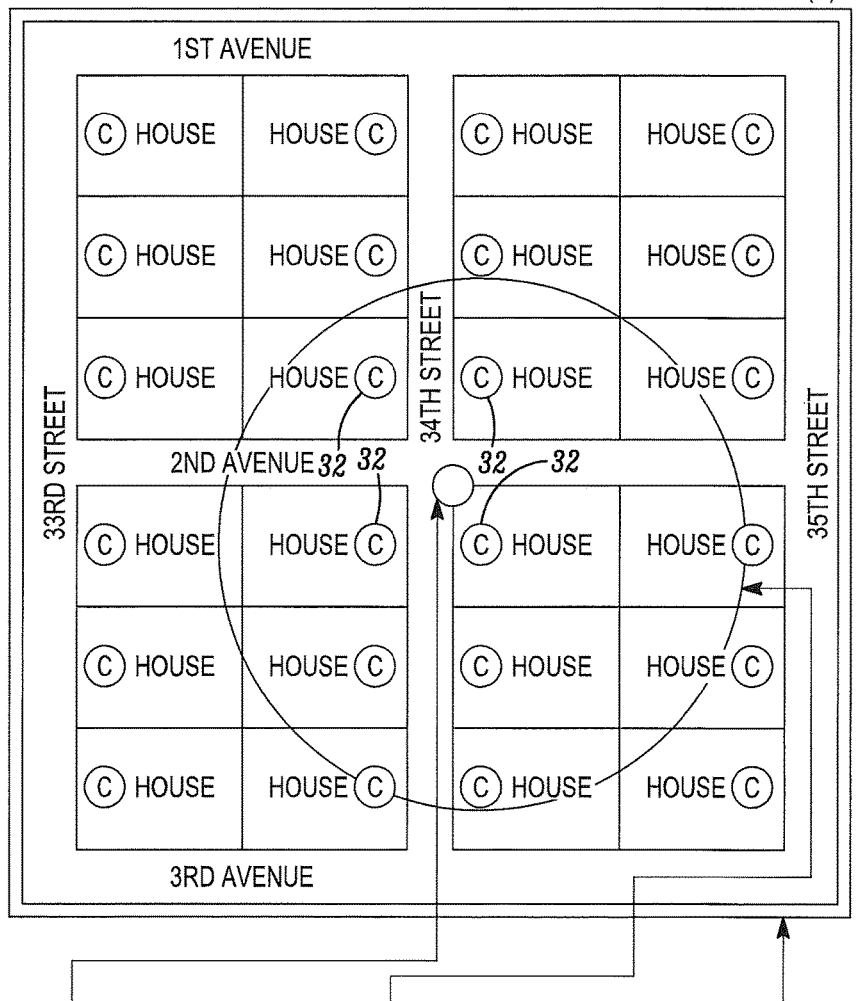
FIG. 2 is a geographic diagram of a neighborhood that shows camera activation within the network of FIG. 1.

The motion detection and tracking processors 40, 42 may be used for the benefit of sufferers of Alzheimer's disease. This is a special case of the above examples. The "Amber Alert" application may also be of interest for tracking dementia sufferers who might randomly wander the neighborhood. The diagram of FIG. 2 shows an example of the network of FIG. 1 in operation. All the houses in this map have outward-facing cameras 32 with "neighbor" access selected as described above. A burglary occurs at the corner of 2nd Ave and 34th St in FIG. 2. This homeowner has chosen to link his alarm system 18 to the camera network of the server 38, so the burglary event automatically wakes up cameras 32 in neighboring houses. The homeowner receives an alert message of the alarm and can access the cameras 32 inside the illustrated circle to see what is happening in the area. The central station and local police precinct can see all cameras in the entire area. By this method, they can observe the criminal to get a physical description, and they can follow him through his escape route. Note that even if the burglar destroys the camera(s) 32 in the victim's house, or cuts the Internet connection, it will not be feasible for him to disable all the cameras 32 in the neighborhood.

A specific embodiment of a security system has been described for the purpose of illustrating the manner in which the security system is made and used. It should be understood that the implementation of other variations and modifications of the security system and its various aspects will be apparent to one skilled in the art, and that the security system is not limited by the specific embodiments described. Therefore, it is contemplated to cover the present security system and any and all modifications, variations, or equivalents that fall within the true spirit and scope of the basic underlying principles disclosed and claimed herein.

The invention claimed is:

1. A method comprising:

providing a plurality of security systems networked together by a server geographically remote from at least one of the plurality of security systems, each of the plurality of security systems protecting a respective building;

linking a respective camera to each of the plurality of security systems;

receiving respective first user input assigning the respective camera of each of the plurality of security systems a respective sharing criteria, the respective sharing criteria indicating a respective proactive election to share respective access or not share the respective access with each of the plurality of security systems not linked to the respective camera of a linked one of the plurality of security systems and/or share the respective access or not share the respective access with local law enforcement;

storing the respective sharing criteria assigned to the respective camera of each of the plurality of security systems in a memory of the server;

detecting an alarm event in a first one of the plurality of security systems;

the first one of the plurality of security systems sending a report of the alarm event to the server:
responsive to receiving the report of the alarm event from the first one of the plurality of security systems, the server querying the memory of the server to identify a group of cameras that includes the respective camera of the first one of the plurality of security systems and the respective camera of each of the plurality of security systems for which the respective sharing criteria indicates the respective proactive election to share the respective access with the first one of the plurality of security systems; and
responsive to identifying the group of cameras, the server instructing each of the group of cameras to record a respective video of a respective public area proximate the respective building protected by a respective one of the plurality of security systems.

2. The method of claim 1 further comprising saving the respective video recorded by each of the group of cameras in the memory of the server.

3. The method of claim 2 wherein the respective sharing criteria assigned to the respective camera of each of the plurality of security systems includes one of a respective private sharing criteria, a respective public sharing criteria, a respective available for law enforcement use sharing criteria, or a respective available for use by neighbors sharing criteria,
wherein the respective private sharing criteria indicates the respective proactive election to not share the respective access with each of the plurality of security systems not linked to the respective camera of the linked one of the plurality of security systems and to not share the respective access with the local law enforcement,
wherein the respective public sharing criteria indicates the respective proactive election to share the respective access with each of the plurality of security systems not linked to the respective camera of the linked one of the plurality of security systems and to share the respective access with the local law enforcement,
wherein the respective available for law enforcement use sharing criteria indicates the respective proactive election to not share the respective access with each of the plurality of security systems not linked to the respective camera of the linked one of the plurality of security systems and to share the respective access with the local law enforcement, and
wherein the respective available for use by neighbors sharing criteria indicates the respective proactive election to share the respective access with each of the plurality of security systems not linked to the respective camera of the linked one of the plurality of security systems that are designated as direct or close neighbors of the linked one of the plurality of security systems and to share the respective access with the local law enforcement.

4. The method of claim 1 further comprising:
the server detecting that the respective camera of a second one of the plurality of security systems has been power cycled or physically moved; and
responsive thereto, the server setting the respective sharing criteria assigned to the respective camera of the second one of the plurality of security systems to indicate the respective proactive election to not share the respective access with the first one of the plurality of security systems and to not share the respective access with the local law enforcement.

5. The method of claim 1 further comprising linking the respective video recorded by each of the group of cameras to a respective social network account of a respective owner of the respective building protected by the respective one of the plurality of security systems.

6. The method of claim 1 further comprising identifying a respective geolocation of the respective camera of each of the plurality of security systems.

7. The method of claim 6 further comprising:
the server identifying a subset of the group of cameras based on the respective geolocation of each of the group of cameras relative to the respective geolocation of the respective camera of the first one of the plurality of security systems; and
responsive to receiving the report of the alarm event from the first one of the plurality of security systems, instructing only each of the subset of the group of cameras to record the respective video.

8. The method of claim 1 further comprising tracking a moving object across the respective video recorded by each of the group of cameras.

9. A system comprising:
a plurality of security systems networked together by a server geographically remote from at least one of the plurality of security systems;
a respective camera linked to each of the plurality of security systems;
a respective transceiver of each of the plurality of security systems;
a respective programmable processor of each of the plurality of security systems; and
respective executable control software stored on a non-transitory computer readable medium of each of the plurality of security systems,
wherein the respective transceiver of each of the plurality of security systems is coupled to the respective camera of a respective one of the plurality of security systems,
wherein each of the plurality of security systems protects a respective building,
wherein the respective camera of each of the plurality of security systems is assigned a respective sharing criteria via a respective first user input,
wherein the respective sharing criteria indicates a respective proactive election to share respective access or not share the respective access with each of the plurality of security systems not linked to the respective camera of a linked one of the plurality of security systems and/or share the respective access or not share the respective access with local law enforcement,
wherein the respective programmable processor and the respective executable control software of each of the plurality of security systems store the respective sharing criteria assigned to the respective camera of each of the plurality of security systems in a memory of the server,
wherein the respective programmable processor and the respective executable control software of a first one of the plurality of security systems receive, via the respective transceiver of the first one of the plurality of security systems, a first signal indicative of an alarm event detected by the first one of the plurality of security systems, and responsive thereto, send, via the respective transceiver of the first one of the plurality of security systems, a report of the alarm event to the server,
wherein, responsive to receiving the report of the alarm event, the server queries the memory of the server to identify a group of cameras that includes the respective camera of the first one of the plurality of security systems and the respective camera of each of the plurality of security systems for which the respective sharing criteria indicates the respective proactive election to share the respective access with the first one of the plurality of security systems, and wherein, responsive to identifying the group of cameras, the server instructs each of the group of cameras to record a respective video of a respective public area proximate the respective building protected by a respective one of the plurality of security systems.

10. The system of claim 9 wherein the server saves the respective video recorded by each of the group of cameras in the memory.

11. The system of claim 10 wherein the respective sharing criteria assigned to the respective camera of each of the plurality of security systems includes one of a respective private sharing criteria, a respective public sharing criteria, a respective available for law enforcement use sharing criteria, or a respective available for use by neighbors sharing criteria, wherein the respective private sharing criteria indicates the respective proactive election to not share the respective access with each of the plurality of security systems not linked to the respective camera of the linked one of the plurality of security systems and to not share the respective access with the local law enforcement, wherein the respective public sharing criteria indicates the respective proactive election to share the respective access with each of the plurality of security systems not linked to the respective camera of the linked one of the plurality of security systems and to share the respective access with the local law enforcement, wherein the respective available for law enforcement use sharing criteria indicates the respective proactive election to not share the respective access with each of the plurality of security systems not linked to the respective camera of the linked one of the plurality of security systems and to share the respective access with the local law enforcement, and wherein the respective available for use by neighbors sharing criteria indicates the respective proactive election to share the respective access with each of the plurality of security systems not linked to the respective camera of the linked one of the plurality of security systems that are designated as direct or close neighbors of the linked one of the plurality of security systems and to share the respective access with the local law enforcement.

12. The system of claim 9 wherein, responsive to detecting that the respective camera of a second one of the plurality of security systems has been power cycled or physically moved, the server sets the respective sharing criteria assigned to the respective camera of the second one of the plurality of security systems to indicate the respective proactive election to not share the respective access with the first one of the plurality of security systems and to not share the respective access with the local law enforcement.

13. The system of claim 9 wherein the respective programmable processor and the respective executable control software of each of the plurality of security systems identify a respective geolocation of the respective camera of the respective one of the plurality of security systems and transmit, via the respective transmitter, the respective geolocation of the respective camera of the respective one of the plurality of security systems to the server.

14. The system of claim 13 wherein the server determines a subset of the group of cameras based on the respective geolocation of each of the group of cameras relative to the respective geolocation of the respective camera of the first one of the plurality of security systems and, responsive thereto, instructs only each of the subset of the group of the plurality of cameras to record the respective video.

15. The system of claim 9 wherein the respective programmable processor and the respective executable control software of the first one of the security systems track a moving object across the respective video recorded by each of the group of cameras.

* * * * *